(12) United States Patent
Son et al.

(10) Patent No.: US 8,367,190 B2
(45) Date of Patent: Feb. 5, 2013

(54) AT LOW TEMPERATURE, FAST HARDENING COMPOSITION FOR PREPARING PROTECTING FILM, PROTECTING FILM PREPARED THEREFROM, AND SUBSTRATE COMPRISING THE SAME

(75) Inventors: Jeong-Man Son, Gyeongju-si (KR); Minjin Ko, Daejeon (KR); Myungsun Moon, Daejeon (KR); Byung-Ro Kim, Daejeon (KR); Jaeho Cheong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 873 days.

(21) Appl. No.: 12/311,023

(22) PCT Filed: Sep. 18, 2007

(86) PCT No.: PCT/KR2007/004491
§ 371 (c)(1),
(2), (4) Date: Mar. 17, 2009

(87) PCT Pub. No.: WO2008/035890
PCT Pub. Date: Mar. 27, 2008

(65) Prior Publication Data
US 2010/0080973 A1  Apr. 1, 2010

(30) Foreign Application Priority Data

Sep. 18, 2006  (KR) .................. 10-2006-0090311

(51) Int. Cl.
*B32B 7/02* (2006.01)
(52) U.S. Cl. .................. 428/212; 428/411.1; 522/172; 522/59; 522/63; 522/65
(58) Field of Classification Search .................. 428/212, 428/411.1; 522/172, 59, 63, 65
See application file for complete search history.

(56) References Cited

U.S. PATENT DOCUMENTS

| 5,861,235 A | 1/1999 | Harkness et al. |
| 6,703,190 B2 * | 3/2004 | Elian et al. ..................... 430/324 |
| 6,737,117 B2 * | 5/2004 | Boisvert et al. ............... 427/377 |
| 2007/0185263 A1 | 8/2007 | Sakamoto et al. |

FOREIGN PATENT DOCUMENTS

| JP | 10-83080 A | 3/1998 |
| JP | 2004-099579 A | 4/2004 |
| JP | 2005-264156 A | 9/2005 |
| JP | 2007-177219 A | 7/2007 |
| JP | 2007-211061 A | 8/2007 |
| KR | 10-2001-0085567 A | 9/2001 |
| KR | 10-2006-0065667 | 6/2006 |
| KR | 10-2007-0051720 A | 5/2007 |

OTHER PUBLICATIONS

Brian R. Harkness et al., "Photopatternable Thin Films from Silyl Hydride Containing Silicone Resins and Photobase Generators", Polymers for Advanced Technologies, Polym. Adv. Technol. vol. 10, 669-677 (1999).

* cited by examiner

*Primary Examiner* — Maria Veronica Ewald
*Assistant Examiner* — Lawrence Ferguson
(74) *Attorney, Agent, or Firm* — McKenna Long & Aldridge LLP

(57) ABSTRACT

The present invention relates to a composition for preparing an excellent protecting film with high strength, wear resistance, and excellent barrier property by low temperature hardening, a protecting film prepared therefrom, a substrate comprising the same, and a component or device comprising the same. The composition comprises an organosiloxane polymer a), a photobase generator b), and an organic solvent c).

13 Claims, 3 Drawing Sheets

AT LOW TEMPERATURE, FAST HARDENING COMPOSITION FOR PREPARING PROTECTING FILM, PROTECTING FILM PREPARED THEREFROM, AND SUBSTRATE COMPRISING THE SAME

This application claims priority from PCT/KR2007/004491 filed on Nov. 21, 2007 and Korean Patent Application No. 2006-0090311 filed on Sep. 18, 2006, The Korean Intellectual Property Office, both of which are incorporated herein by reference in its entirety.

TECHNICAL FIELD

The present invention relates to a low temperature hardening composition for preparing a protecting film, which has high strength, wear resistance, and excellent barrier property, a protecting film prepared therefrom, a substrate comprising the same, and a component or device comprising the same, more specifically, a composition capable of preparing a protecting film having high strength, wear resistance, and barrier property through low temperature and fast hardening by using a silicone complex with excellent light transmittance, a protecting film prepared therefrom, a substrate comprising the same, and a component or device comprising the same.

BACKGROUND ART

A transparent plastic material has advantages of being light and resistant to shattering. Thus, it has been considered as an alternative to a known glass in the optical lens industry, flat panel display or the like. In particular, more recent demands for a portable display have increased according to the development of mobile communications, and the next-generation rollable display has been realized. Therefore, the concerns for transparent plastic material have been doubled. However, most of plastic materials have soft surface, so that their surface strength and wear resistance are bad. Therefore, there is a problem that they are easily scratched. In addition, plastic materials have unsatisfactory barrier properties to various gases including oxygen. Thus, there is a limitation in their application to most of flat panel display based on organic materials.

In order to overcome the limitations of plastic materials, a protecting film is generally formed on the surface of plastic material by using an organic, inorganic, or organic-inorganic complex as a coating agent, and used. Specifically, a silicone-based coating agent has been recently considered because of its excellent light transmittance, reproductive property or the like. In addition, since silicone is ubiquitous or unharmful to environment and human to be recognized as an environment-friendly material, it has been noted as an alternative candidate for other organic polymer and metal coating agents.

However, since the silicone-based coating agent is provided for a plastic substrate, there is a limitation that all of the coating and application process should be performed at low temperature, which is lower than a glass transition temperature allowed by the substrate material. Accordingly, most of high strength silicone coating process has required expensive equipments such as sputtering, vacuum evaporation, ion deposition, and PECVD (plasma enhanced chemical vapor deposition). However, in the case of using such physical/chemical application method, there are problems that the reduction in profit is caused due to the expensive equipments, and the process should be performed for a long period of time to obtain a coating with a predetermined thickness, thereby resulting in a limitation of productivity.

On the contrary, a conventional liquid coating method using a silicone-based polymer such as spin coating, dip coating, roll coating, and spray coating has apparent advantages with respect to basic equipments or processing time. However, the silicone coating by the liquid application slowly hardens at low temperature, and upon hardening it for a long period of time, the hardening reaction does not sufficiently occur not to achieve sufficient mechanical properties such as membrane strength, and wear resistance, barrier property or the like. In order to facilitate the reaction of siloxane polymer, a method for improving reactivity by using a coating composition containing an acid, a base, an ammonium salt or the like has been generally known. However, in the case of using an acid catalyst and ammonium salt, the improved properties are not sufficiently obtained. In the case of using a base catalyst such as aqueous ammonia and organic amine that facilitates condensation of silicone-based resin, there is a problem that the storage of coating composition itself is reduced, so that it cannot be substantially applied to the process.

In the conventional technologies, a specific method for achieving low temperature hardening, a problem-free process, and improving the mechanical properties of substrate, barrier property or the like by using a base catalyst such as aqueous ammonia and organic amine has not been yet disclosed. Accordingly, a method for improving strength of substrate, wear resistance, barrier property or the like under the process condition of low temperature is greatly needed.

DISCLOSURE

Technical Problem

It is an object of the present invention to provide a composition capable of preparing a protecting film having excellent mechanical strength, wear resistance, and barrier property by using a specific catalyst, in the case of performing the above-described low temperature process, a protecting film prepared therefrom, a substrate comprising the same, and a component or device comprising the same.

Technical Solution

In order to achieve the object, the present invention provides a composition for preparing a protecting film comprising:
a) organosiloxane polymer,
b) photobase generator, and
c) organic solvent.

Further, the present invention provides a method for preparing a protecting film comprising the steps of:
a) coating the composition for preparing a protecting film on a substrate; and
b) drying, exposing to light, and heat-treating the composition.

Further, the present invention provides a protecting film prepared from the composition for preparing a protecting film.

Further, the present invention provides a substrate, of which at least one side is provided with the protecting film.

Further, the present invention provides a component or device comprising the substrate.

Advantageous Effects

When a protecting film is prepared at low temperature of 0 to 250° C. by using the composition for preparing a protecting film of the present invention, a protecting film having excellent mechanical strength, wear resistance, and barrier property can be prepared.

BEST MODE

Figure 1:
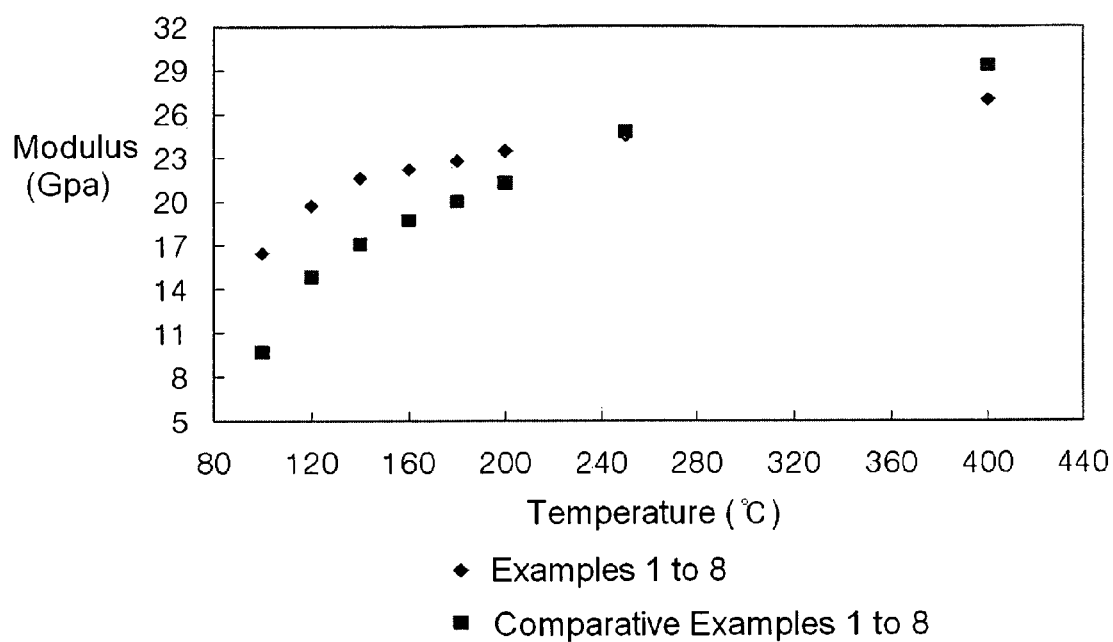
FIG. 1 is a graph showing modulus values of a protecting film prepared in the present invention according to temperature.

Hereinafter, the present invention will be described in more detail.

The composition for preparing a protecting film of the present invention comprises an organosiloxane polymer a), a photobase generator b), and an organic solvent c).

The composition for preparing a protecting film according to the present invention has problems in its mechanical properties at a conventional hardening temperature, for example, high temperature of 400° C. or more. However, the composition has the improved mechanical properties by heat treatment at a specific temperature, for example, 0 to 250° C. that is lower than the glass transition temperature (Tg) of most of plastic substrates, preferably heat treatment can be performed at 100 to 250° C.

In the composition for preparing a protecting film according to the present invention, the organosiloxane polymer a) is preferably an organosiloxane polymer polymerized from one or more silane compounds selected from the group consisting of one or more monomers selected from the group consisting of compounds represented by the following Formula 1 and Formula 2; a dimer prepared from the monomers; and an oligomer prepared from the monomers, dimers, or mixture thereof, but is not specifically limited thereto as long as polymerized from a silane compound:

     [Formula 1]

wherein, $R^1$ is each independently hydrogen; fluorine; aryl; vinyl; allyl; linear or branched alkyl having 1 to 20 carbon atoms that is unsubstituted or substituted with fluorine, $R^2$ is each independently a hydrolyzable functional group such as linear or branched alkoxy having 1 to 4 carbon atoms, acetoxy, and chlorine, p is an integer of 0 to 2,

     [Formula 2]

wherein, $R^3$ and $R^5$ are each independently hydrogen; fluorine; aryl; vinyl; allyl; or linear or branched alkyl having 1 to 20 carbon atoms that is unsubstituted or substituted with fluorine, $R^4$ and $R^6$ are each independently a hydrolyzable functional group such as linear or branched alkoxy having 1 to 4 carbon atoms, acetoxy, and chlorine, M is alkylene having 1 to 6 carbon atoms or arylene, q and r are each independently an integer of 0 to 2.

The weight-average molecular weight of the organosiloxane polymer is suitably a polystyrene-converted molecular weight of 500 or more, preferably 500 to 100,000, and more preferably 500 to 50,000. In the case where the weight-average molecular weight of the organosiloxane polymer is less than 500, the coating property of protecting film can be deteriorated, and in the case where the weight-average molecular weight of the organosiloxane polymer is 100,000 or more, the strength of protecting film can be deteriorated.

The organosiloxane polymer can be prepared by mixing one or more silane compounds selected from the group consisting of one or more monomers selected from the group consisting of compounds represented by Formula 1 and Formula 2, a dimer prepared from the monomers, and an oligomer prepared from the monomers, dimers, or mixture thereof; a catalyst; and water, and then performing hydrolysis and condensation reaction of the silane compounds.

The hydrolysis and condensation reaction can be performed by further adding an organic solvent, if desired, and in order to easily control the molecular weight of the polymerized organosiloxane polymer, the hydrolysis and condensation reaction is preferably performed in the presence of an organic solvent.

Any organic solvent can be used as the organic solvent that can be used in the preparation of the organosiloxane polymer, as long as it does not affect the hydrolysis and condensation reaction of silane compound, and is preferably one or more selected from the group consisting of aliphatic hydrocarbon-based solvent, aromatic hydrocarbon-based solvent, alcohol-based solvent, ketone-based solvent, ether-based solvent, ester-based solvent, and amide-based solvent.

Specific examples of the organic solvent include one or more aliphatic hydrocarbon-based solvents selected from the group consisting of n-pentane, i-pentane, n-hexane, i-hexane, 2,2,4-trimethylpentane, cyclohexane, and methylcyclohexane; one or more aromatic hydrocarbon-based solvents selected from the group consisting of benzene, toluene, xylene, trimethylbenzene, ethylbenzene, and methylethylbenzene; one or more alcohol-based solvents selected from the group consisting of methylalcohol, ethylalcohol, n-propanol, i-propanol, n-butanol, i-butanol, sec-butanol, t-butanol, 4-methyl-2-pentanol, cyclohexanol, methylcyclohexanol, and glycerol; one or more ketone-based solvents selected from the group consisting of methylethylketone, methylisobutylketone, diethylketone, methyl n-propylketone, methyl n-butylketone, cyclohexanone, methylcyclohexanone, and acetylacetone; one or more ether-based solvents selected from the group consisting of tetrahydrofuran, 2-methyltetrahydrofuran, ethylether, n-propylether, isopropylether, diglyme, dioxine, dimethyldioxine, ethyleneglycolmonomethylether, ethyleneglycoldimethylether, ethyleneglycoldiethylether, propyleneglycolmonomethylether, and propyleneglycoldimethylether; one or more ester-based solvents selected from the group consisting of diethylcarbonate, methylacetate, ethylacetate, ethyllactate, ethyleneglycolmonomethyletheracetate, propyleneglycolmonomethyletheracetate, and ethyleneglycoldiacetate; and one or more amide-based solvents selected from the group consisting of N-methylpyrrolidone, formamide, N-methylformamide, N-ethylformamide, N,N-dimethylacetamide, and N,N-diethylacetamide.

An acid catalyst or base catalyst can be used as a catalyst used in the hydrolysis and condensation reaction of the silane compound, and it is generally preferably that an acid catalyst is used for the purpose of preparing a protecting film with high strength.

The acid catalyst is preferably one or more selected from the group consisting of hydrochloric acid, nitric acid, sulfuric acid, phosphoric acid, hydrofluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, oleic acid, methylmalonic acid, adipic acid, p-aminobenzoic acid, and p-toluenesulfonic acid, but is not specifically limited thereto.

Further, the base catalyst is preferably one or more selected from the group consisting of alkaline metal compound, aqueous ammonia, organic amine, and quarternary ammonium compound, but is not specifically limited thereto.

The amount of the catalyst added is suitably, but not specifically limited, selected according to the types of catalyst and silane compound, whereby a detail explanation thereof is omitted.

Water that is contained with the catalyst in order to prepare the organosiloxane polymer is added for the hydrolysis of silane compound. The amount of water contained in the preparation process of the organosiloxane polymer is preferably 1 to 30 moles, more preferably 2 to 20 moles per 1 mole of the hydrolyzable functional group of silane compound used in the polymerization. In the case where the water content is less than 1 mole per 1 mole of the hydrolyzable functional group of silane compound used in the polymerization, the hydrolysis and condensation reaction do not sufficiently occur. In the case where the water content is more than 30 moles per 1 mole of the hydrolyzable functional group of silane compound used in the polymerization, the hydrolysis and condensation reaction do not uniformly occur due to phase separation, and the coating property can be deteriorated.

There are continuous and intermittent additions as a method of adding water during the preparation of organosiloxane polymer. At this time, the catalyst may be previously mixed with an organic solvent, and added in the state of solution that catalyst is dissolved or dispersed in water.

The hydrolysis and condensation reaction of organosiloxane polymer is preferably performed at 0 to 100° C.

The photobase generator b) contained in the composition for preparing a protecting film of the present invention can be added by the method of mixing with organosiloxane polymer and the organic solvent.

The photobase generator is not specifically limited as long as it is a material that generates a base catalyst by exposure to UV irradiation, and examples thereof include 2-nitrobenzylcarbamate, sulfone amide, o-acyloxime, and nifedipines. The amount of photobase generator to be used is not specifically limited, but is 0.1 to 15% by weight, preferably 1 to 10% by weight based on a total solid weight of the organosiloxane. In the case where the content of photobase generator is less than 0.1% by weight, the hardness of protecting film is not satisfactorily improved. In the case where the content of photobase generator is more than 15% by weight, storage is deteriorated and the strength of protecting film is not more improved.

More specific examples of the photobase generator include nitrobenzylcyclohexylcarbamate, 3,5-dimethoxybenzylcyclohexylcarbamate, 3-nitrophenylcyclohexylcarbamate, benzylcyclohexylcarbamate, [[(2-nitrobenzyl)oxy]carbonyl]octylamine, [[(2-nitrobenzyl)oxy]carbonyl]cyclohexylamine, [[(2-nitrobenzyl)oxy]carbonyl]piperazine, bis[[(2-nitrobenzyl)oxy]carbonyl]hexane-1,6-diamine, [[(2,6-dinitrobenzyl)oxy]carbonyl]cyclohexylamine, bis[[(2,6-dinitrobenzyl)oxy]carbonyl]hexane-1,6-diamine, N-[[(2-nitrophenyl)-1-methylmethoxy]carbonyl]cyclohexylamine, N-[[(2-nitrophenyl)-1-methylmethoxy]carbonyl]-octadecylamine, bis[[(α-methyl-2-nitrobenzyl)oxy]carbonyl]hexane, 1,6-diamine, N-[[(2,6-dinitrophenyl)-1-methylmethoxy]carbonyl]cyclohexylamine, N-[[(2-nitrophenyl)-1-(2'-nitrophenyl)methoxy]carbonyl]cyclohexyl amine, N-[[(2,6-dinitrophenyl)-1-(2',6'-dinitrophenyl)methoxy]carbonyl]cyclohexylamine, N-cyclohexyl-4-methylphenylsulfonamide, N-cyclohexyl-2-naphthylsulfonamide, o-phenylacetyl-2-acetonaphthonoxim, and N-methylnifedipine, but are not limited thereto. Further, the photobase generator can be used individually or in a mixture of two or more.

The type of organic solvent c) contained in the composition for preparing a protecting film of the present invention is not specifically limited, and may be the organic solvent used in the preparation of organosiloxane polymer, an organic solvent newly added after the preparation of organosiloxane polymer, or a mixed solvent of the organic solvent used in the preparation of organosiloxane polymer and the organic solvent newly added.

Preferred examples of the organic solvent are the same as examples of the organic solvent used in the preparation of organosiloxane polymer, whereby a detail explanation thereof is omitted.

However, in the case of containing the organic solvent used in the preparation of organosiloxane polymer, it is preferable that a specific organic solvent deteriorating the coating property of the composition for preparing a protecting film, byproducts generated in the preparation process of organosiloxane polymer, and water are removed at a predetermined amount.

The composition for preparing a protecting film can contain other components in the composition according to the purpose. For example, in order to improve the mechanical strength, silica particles can be contained, and in order to control a refractive index, low-refractive index particles, high-refractive index inorganic particles or the like can be contained. Further, in order to provide anti-static function, metal particles, or additives such as or organic/inorganic salts and conductive organic materials can be contained. Further, a general silane coupling agent such as epoxy-based, amine-based, and acryl-based, a coloring agent, or a leveling agent to improve the coating property can be used according to their uses.

The composition for preparing a protecting film comprising the organosiloxane polymer and the photobase generator is applied on a substrate that is selected according to its use, dried, exposed to light, and heat-treated to prepare the protecting film of the present invention.

Further, the present invention provides a method for preparing the protecting film, comprising the steps of:

a) coating the composition for preparing a protecting film on a substrate; and b) drying, exposing to light, and heat-treating the composition.

In the method for preparing the protecting film according to the present invention, the step a) is a step of coating the composition for preparing a protecting film of the present invention on a substrate. The substrate is not specifically limited, and the composition can be applied on a plastic substrate, a glass substrate, a metal substrate, a silicon wafer, or a $SiO_2$ wafer, in particular, suitably applied on a plastic substrate or a silicon wafer requiring the improvement in high strength, wear resistance, and barrier property by low temperature hardening.

The coating thickness of the composition for preparing a protecting film is controlled depending on the concentration of the solids contained in the composition. The solid concentration of the composition for preparing a protecting film is preferably 2 to 60% by weight, more preferably 5 to 40% by weight.

In the case where the solid concentration is less than 2% by weight, the thickness of protecting film cannot be sufficiently formed. In the case where the solid concentration is more than 60% by weight, the coating property and storage stability are deteriorated.

A conventional liquid coating method can be used as a method of coating the composition for preparing a protecting film on the substrate, and spin coating, dip coating, bar coating, roll coating, spray coating or the like can be preferably used.

In the method for preparing the protecting film according to the present invention, the step b) is a step of drying, exposing to light, and heat-treating the composition for preparing a protecting film. The exposure to light is performed to photoharden the composition for preparing a protecting film and to generate a base catalyst from the photobase generator. At this time, mercury vapor arc, carbon arc, or xenon (Xe) arc emitting a wavelength of 250 to 450 nm can be used as a light source.

The composition for preparing a protecting film is preferably dried at 0 to 100° C. according to an evaporation temperature of the organic solvent contained in the composition, and the heat-treatment temperature is preferably 0 to 250° C., more preferably 100 to 250° C. according to thermal characteristics of the substrate used.

Further, the present invention provides a protecting film prepared from the composition for preparing a protecting film.

The protecting film has properties of excellent mechanical strength and wear resistance, and has fewer residual functional groups. Thus, the protecting film can be used as a variety of optical products including a high/low refractive optical lens, a variety of protecting films for flat panel display including a liquid crystal display device, a gas barrier film or the like.

The thickness of the protecting film can be variously controlled according to its uses, but is not limited to, preferably 0.05 to 2 μm in the case of being used as a transparent substrate requiring light transmittance.

The protecting film prepared by the method for preparing a protecting film according to the present invention can be used with the substrate used in the preparation method. Alternatively, the substrate and the protecting film are separated to commercialize the individual protecting film, or the protecting film is attached to other substrate to be used.

Further, the present invention provides a substrate comprising the protecting film. As described above, the substrate can be prepared, on which the composition of the present invention is coated or attached.

Further, the present invention provides a component or device comprising the substrate.

Examples of the component or device include, but are not limited to, optical products and liquid crystal display devices.

MODE FOR INVENTION

Hereinafter, preferred Examples of the present invention are described. However, these Examples are one of preferred Examples of the present invention, and the invention is not intended to be limited by these Examples.

Example 1

1) Preparation of Composition for Preparing a Protecting Film 104.2 g of tetramethoxysilane (TMS) was added to 134.1 g of i-propanol as an organic solvent, and then 44.1 g of 0.01N aqueous solution of nitric acid was slowly added thereto. The mixture was reacted at room temperature (25° C.) for 30 minutes, and then heated by slowly raising the temperature to 80° C., so as to be reacted under reflux for 2 hours.

After the reaction was completed, the temperature of the solution is decreased to room temperature, and 134.1 g of i-propanol solvent was further added thereto. In a rotary evaporator, nitric acid and an excessive amount of water were removed under reduced pressure to prepare 20% by weight of organosiloxane polymer solution.

5% by weight of [[(2-nitrobenzyl)oxy]carbonyl]octylamine as a photobase generator was added to the organosiloxane polymer, based on a solid weight of the polymer.

[[(2-nitrobenzyl)oxy]carbonyl]octylamine as the photobase generator was prepared as follows.

11.4 ml of n-octylisocyanate, 10 g of 2-nitrobenzylalcohol, and 100 ml of toluene were mixed together, and reacted under reflux. After 2 hours, an organic layer was washed with distilled water over three times. Residual water was removed using anhydrous sodium sulfate, and filtered. Then, in the rotary evaporator, the solvent was clearly removed under reduced pressure to prepare about 12 g of powdery [[(2-nitrobenzyl)oxy]carbonyl]octylamine.

2) Preparation of Protecting Film

The prepared composition for preparing a protecting film was spin-coated on a silicon wafer to prepare a protecting film, and dried on a hot plate at 80° C. for 1 minute to evaporate the solvent.

The exposure was performed at 200 mJ/cm$^2$ using a UV exposure system, and heat-treatment was performed at 100° C. for 2 minutes.

Example 2

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 120° C. for 2 minutes.

Example 3

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 140° C. for 2 minutes.

Example 4

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 160° C. for 2 minutes.

Example 5

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 180° C. for 2 minutes.

Example 6

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 200° C. for 2 minutes.

Example 7

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 250° C. for 2 minutes.

Example 8

1) Preparation of Composition for Preparing a Protecting Film

A composition for preparing a protecting film was prepared in the same manner as in Example 1.

2) Preparation of Protecting Film

A sample that had been coated, dried, and exposed to UV in the same manner as in Example 1 was heat-treated at 400° C. for 2 minutes.

Example 9

1) Preparation of Composition for Preparing a Protecting Film 45.0 g of methylmethoxysilane (MTMS) and 50.2 g of tetramethoxysilane (TMS) were added to 146.7 g of i-propanol as an organic solvent, and then 42.6 g of 0.01N aqueous solution of nitric acid was slowly added thereto. The mixture was reacted at room temperature (25° C.) for 30 minutes, and then heated by slowly raising the temperature to 80° C., so as to be reacted under reflux overnight (24 hours).

After the reaction was completed, 20% by weight of organosiloxane polymer solution was prepared in the same manner as in Example 1, and 5% by weight of photobase generator that is the same as in Example 1 was added thereto based on a solid weight of the polymer to prepare a composition for preparing a protecting film.

2) Preparation of Protecting Film

A sample that had been coated, dried, and exposed to UV in the same manner as in Example 1 was heat-treated at 140° C. for 2 minutes.

Example 10

1) Preparation of Composition for Preparing a Protecting Film 25.5 g of methylmethoxysilane (MTMS) and 29 g of tetramethoxysilane (TMS) were added to 175.8 g of i-propanol as an organic solvent and 23 g of water, and then 4 g of aqueous ammonia was slowly added thereto. The mixture was reacted at room temperature (25° C.) for 30 minutes, and then heated by slowly raising the temperature to 80° C., so as to be reacted under reflux for 2 hours.

After the reaction was completed, 20% by weight of organosiloxane polymer solution was prepared in the same manner as in Example 1, and 5% by weight of photobase generator that is the same as in Example 1 was added thereto based on a solid weight of the polymer to prepare a composition for preparing a protecting film.

2) Preparation of Protecting Film

A sample that had been coated, dried, and exposed to UV in the same manner as in Example 1 was heat-treated at 140° C. for 2 minutes.

Example 11

1) Preparation of Composition for Preparing a Protecting Film 2.9 g of tetramethoxysilane (TMS) was added to the organosiloxane polymer in Example 10, and reacted at room temperature for 2 hours.

After the reaction was completed, 20% by weight of organosiloxane polymer solution was prepared in the same manner as in Example 1, and 5% by weight of photobase generator that is the same as in Example 1 was added thereto based on a solid weight of the polymer to prepare a composition for preparing a protecting film.

2) Preparation of Protecting Film

A sample that had been coated, dried, and exposed to UV in the same manner as in Example 1 was heat-treated at 140° C. for 2 minutes.

Example 12

1) Preparation of Composition for Preparing a Protecting Film 20 g of 4-methyl-2-pentanol was added to 20 g of MIBK-ST, which is colloidal silica from Nissan Chemical Industries, Ltd, to be 15% by weight, and 5% by weight of photobase generator that is the same as in Example 1 was added thereto based on a solid weight of the polymer to prepare a coating solution.

2) Preparation of Protecting Film

A sample that had been coated, dried, and exposed to UV in the same manner as in Example 1 was heat-treated at 140° C. for 2 minutes.

Example 13

1) Preparation of Composition for Preparing a Protecting Film

An organosiloxane polymer was prepared in the same manner as in Example 1, and 5% by weight of [[(2-nitrobenzyl)oxy]carbonyl]cyclohexylamine was added thereto to prepare a composition for preparing a protecting film.

[[(2-nitrobenzyl)oxy]carbonyl]cyclohexylamine was prepared using 2-nitrobenzylalcohol, cyclohexylisocyanate, and toluene solvent in the same preparation method of [[(2-nitrobenzyl)oxy]carbonyl]octylamine as in Example 1.

2) Preparation of Protecting Film

A sample that had been coated, dried, and exposed to UV in the same manner as in Example 1 was heat-treated at 140° C. for 2 minutes.

Example 14

1) Preparation of Composition for Preparing a Protecting Film

20% by weight of [[(2-nitrobenzyl)oxy]carbonyl]octylamine as a photobase generator was added to the organosiloxane polymer in Example 1 based on a solid weight of the polymer to prepare a composition for preparing a protecting film.

2) Preparation of Protecting Film

A protecting film was prepared in the same manner as in Example 3.

Comparative Example 1

1) Preparation of Composition for Preparing a Protecting Film

A composition for preparing a protecting film was prepared without adding a photobase generator to the organosiloxane polymer in Example 1.

2) Preparation of Protecting Film

A protecting film was prepared in the same manner as in Example 1.

Comparative Example 2

1) Preparation of Composition for Preparing a Protecting Film

A composition for preparing a protecting film was prepared without adding a photobase generator to the organosiloxane polymer in Example 2.

2) Preparation of Protecting Film

A protecting film was prepared in the same manner as in Example 2.

Comparative Example 3

1) Preparation of Composition for Preparing a Protecting Film

A composition for preparing a protecting film was prepared without adding a photobase generator to the organosiloxane polymer in Example 3.

2) Preparation of Protecting Film

A protecting film was prepared in the same manner as in Example 3.

Comparative Example 4

1) Preparation of Composition for Preparing a Protecting Film

A composition for preparing a protecting film was prepared without adding a photobase generator to the organosiloxane polymer in Example 4.

2) Preparation of Protecting Film

A protecting film was prepared in the same manner as in Example 4.

Comparative Example 5

1) Preparation of Composition for Preparing a Protecting Film

A composition for preparing a protecting film was prepared without adding a photobase generator to the organosiloxane polymer in Example 5.

2) Preparation of Protecting Film

A protecting film was prepared in the same manner as in Example 5.

Comparative Example 6

1) Preparation of Composition for Preparing a Protecting Film

A composition for preparing a protecting film was prepared without adding a photobase generator to the organosiloxane polymer in Example 6.

2) Preparation of Protecting Film

A protecting film was prepared in the same manner as in Example 6.

Comparative Example 7

1) Preparation of Composition for Preparing a Protecting Film

A composition for preparing a protecting film was prepared without adding a photobase generator to the organosiloxane polymer in Example 7.

2) Preparation of Protecting Film

A protecting film was prepared in the same manner as in Example 7.

Comparative Example 8

1) Preparation of Composition for Preparing a Protecting Film

A composition for preparing a protecting film was prepared without adding a photobase generator to the organosiloxane polymer in Example 8.

2) Preparation of Protecting Film

A protecting film was prepared in the same manner as in Example 8.

Comparative Example 9

1) Preparation of Composition for Preparing a Protecting Film

A composition for preparing a protecting film was prepared without adding a photobase generator to the organosiloxane polymer in Example 9.

2) Preparation of Protecting Film

A protecting film was prepared in the same manner as in Example 9.

Comparative Example 10

1) Preparation of Composition for Preparing a Protecting Film

A composition for preparing a protecting film was prepared without adding a photobase generator to the organosiloxane polymer in Example 10.

2) Preparation of Protecting Film

A protecting film was prepared in the same manner as in Example 10.

Comparative Example 11

1) Preparation of Composition for Preparing a Protecting Film

A composition for preparing a protecting film was prepared without adding a photobase generator to the organosiloxane polymer in Example 11.

2) Preparation of Protecting Film

A protecting film was prepared in the same manner as in Example 11.

Comparative Example 12

1) Preparation of Composition for Preparing a Protecting Film

A composition for preparing a protecting film was prepared without adding a photobase generator to the coating solution in Example 12.

2) Preparation of Protecting Film

A protecting film was prepared in the same manner as in Example 12.

Comparative Example 13

1) Preparation of Composition for Preparing a Protecting Film

5% by weight of tetramethylammonium was added to the organosiloxane polymer in Example 1 based on a solid weight of the polymer to prepare a composition for preparing a protecting film.

2) Preparation of Protecting Film

It was tried to prepare a protecting film in the same manner as in Example 3. However, the gelation of the composition occurred in the solution treatment process before spin-coating.

<Measurement of Physical Property of Protecting Film>

1) Mechanical Strength

The modulus and hardness of the protecting film, which had been prepared according to the methods in Examples 1 to 14 and Comparative Examples 1 to 13, were evaluated by using a nanoindentor.

2) Wear Test

The wear test on the protecting film, which had been prepared according to the methods in Example 3, Examples 9 to 14, Comparative Example 3, and Comparative Examples 9 to 13, was performed by using a nanoindentor.

In the wear test, a force of 50 μN was applied to the tip of nanoindentor to scratch an area of 50×50 μm$^2$ of the surface of the protecting film. The scratched surface was compared with the unscratched surface, and the wear depth was measured.

The results are shown in the following FIGS. 1 and 2, and Table 1.

TABLE 1

| Item | Added material (% by weight) | Heat treatment temperature (°C.) | Modulus (Gpa) | Hardness (Gpa) | Wear depth (μm) |
|---|---|---|---|---|---|
| Example 1 | [[(2-nitro benzyl)oxy]carbonyl]octylamine (5%) | 100 | 16.45 | 1.12 | — |
| Example 2 | [[(2-nitro benzyl)oxy]carbonyl]octylamine (5%) | 120 | 19.72 | 1.45 | — |
| Example 3 | [[(2-nitro benzyl)oxy]carbonyl]octylamine (5%) | 140 | 21.62 | 1.66 | 0.11 |
| Example 4 | [[(2-nitro benzyl)oxy]carbonyl]octylamine (5%) | 160 | 22.21 | 1.76 | — |
| Example 5 | [[(2-nitro benzyl)oxy]carbonyl]octylamine (5%) | 180 | 22.81 | 1.84 | — |
| Example 6 | [[(2-nitro benzyl)oxy]carbonyl]octylamine (5%) | 200 | 23.46 | 1.95 | — |
| Example 7 | [[(2-nitro benzyl)oxy]carbonyl]octylamine (5%) | 250 | 24.50 | 2.01 | — |
| Example 8 | [[(2-nitro benzyl)oxy]carbonyl]octylamine (5%) | 400 | 27.01 | 2.23 | — |
| Example 9 | [[(2-nitro benzyl)oxy]carbonyl]octylamine (5%) | 140 | 9.26 | 0.78 | 0.19 |
| Example 10 | [[(2-nitro benzyl)oxy]carbonyl]octylamine (5%) | 140 | 3.86 | 0.22 | 0.45 |
| Example 11 | [[(2-nitro benzyl)oxy]carbonyl]octylamine (5%) | 140 | 3.33 | 0.19 | 0.38 |
| Example 12 | [[(2-nitro benzyl)oxy]carbonyl]octylamine (5%) | 140 | 6.72 | 0.46 | 0.51 |
| Example 13 | [[(2-nitro benzyl)oxy]carbonyl]cyclohexylamine (5%) | 140 | 21.41 | 1.61 | 0.10 |
| Example 14 | [[(2-nitro benzyl)oxy]carbonyl]octylamine (20%) | 140 | 16.54 | 1.12 | 0.71 |
| Comparative Example 1 | — | 100 | 9.68 | 0.85 | — |
| Comparative Example 2 | — | 120 | 14.82 | 1.04 | — |
| Comparative Example 3 | — | 140 | 17.06 | 1.18 | 0.63 |
| Comparative Example 4 | — | 160 | 18.71 | 1.34 | — |
| Comparative Example 5 | — | 180 | 20.03 | 1.53 | — |
| Comparative Example 6 | — | 200 | 21.25 | 1.71 | — |
| Comparative Example 7 | — | 250 | 24.75 | 2.03 | — |
| Comparative Example 8 | — | 400 | 29.33 | 2.54 | — |
| Comparative Example 9 | — | 140 | 8.42 | 0.40 | 0.79 |
| Comparative Example 10 | — | 140 | 2.81 | 0.14 | 0.86 |
| Comparative Example 11 | — | 140 | 1.84 | 0.08 | 0.85 |
| Comparative Example 12 | — | 140 | 4.96 | 0.21 | 0.91 |
| Comparative Example 13 | tetramethylammonium (5%) | 140 | — | — | — |

As shown in the results of Examples 1 to 8 and Comparative Examples 1 to 8 of Table 1, it was found that the protecting films prepared from the composition for a protecting film containing the photobase generator had the improved modulus and hardness by hardening at low temperature of 250° C. or less, as compared to the protecting film containing no photobase generator. However, the improvement slowed down as the temperature increased, and it can be seen that the protecting films prepared in Comparative Examples had higher modulus and hardness values than the protecting films prepared in Examples at a heat-treatment temperature of 250° C. or more. In particular, in the case of the conventional protecting films in Example 8 and Comparative Example 8, which were prepared by heat-treatment of organosiloxane polymer at 400° C., it was found that the protecting film prepared from the composition containing no photobase generator has better modulus and hardness values than the protecting film prepared from the composition containing a photobase generator.

FIG. 1 is a graph showing modulus values according to Examples 1 to 8 and Comparative Examples 1 to 8.

Figure 2:
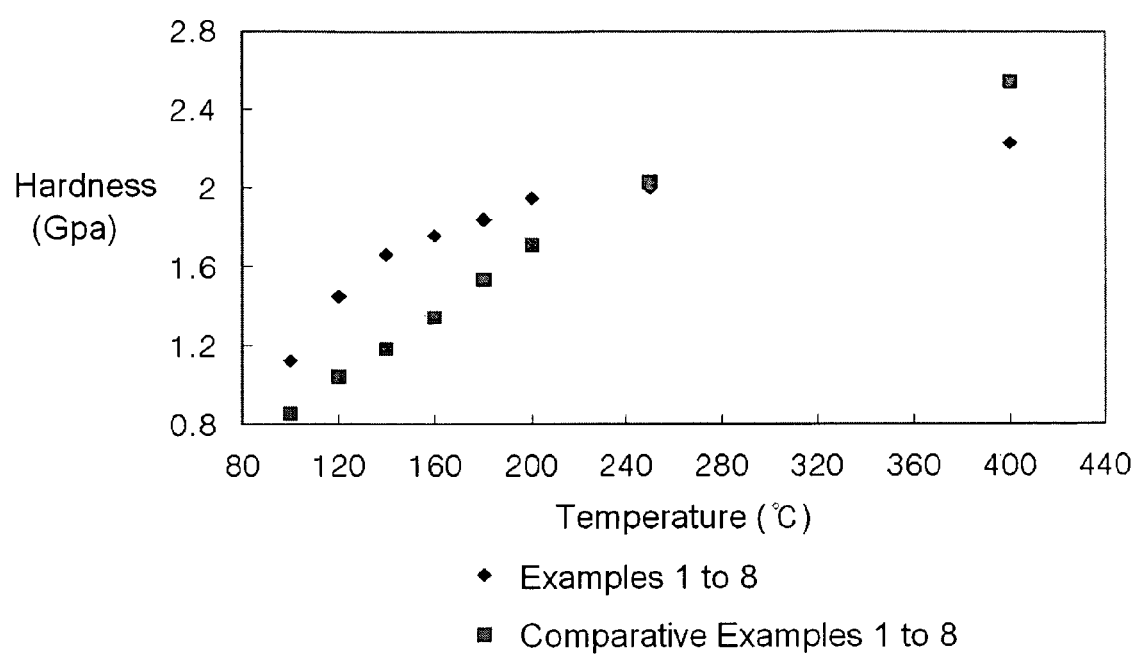
FIG. 2 is a graph showing hardness values of the protecting film prepared in the present invention according to temperature.

FIG. 2 is a graph showing hardness values according to Examples 1 to 8 and Comparative Examples 1 to 8.

As shown in Example 3 and Examples 9 to 12, and Comparative Example 3 and Comparative Examples 9 to 12, with respect to all of the protecting films that were prepared by each different method (acid, base, or base and acid catalyst) and had different mechanical properties, the protecting films prepared from the composition containing the photobase generator were found to have better modulus, hardness, and wear resistance. In particular, the effect of the photobase generator can be confirmed with respect to silica colloid, which is conventionally added for the improvement of mechanical properties of organosilicone polymer, in Example 12 and Comparative Example 12. Further, the same result was found in a siloxane composition containing silica colloid.

The effect of photobase generator was also found in Example 13 of Table 1, which is the case of adding 5% by weight of [[(2-nitro benzyl)oxy]carbonyl]cyclohexylamine. That is, with respect to the mechanical properties, the photobase generator was found to be very effective as in Example 3 and Comparative Example 3.

However, as shown in Example 14, the improved effect of photobase generator on the mechanical properties was found to be less, when it was added in an excessive amount.

Furthermore, in the case of adding a conventional base catalyst such as tetramethylammonium of Comparative Example 13, the dramatic condensation reaction was simultaneously proceeded. Consequently, it was difficult to form a protecting film due to the gelation of the composition.

Figure 3:
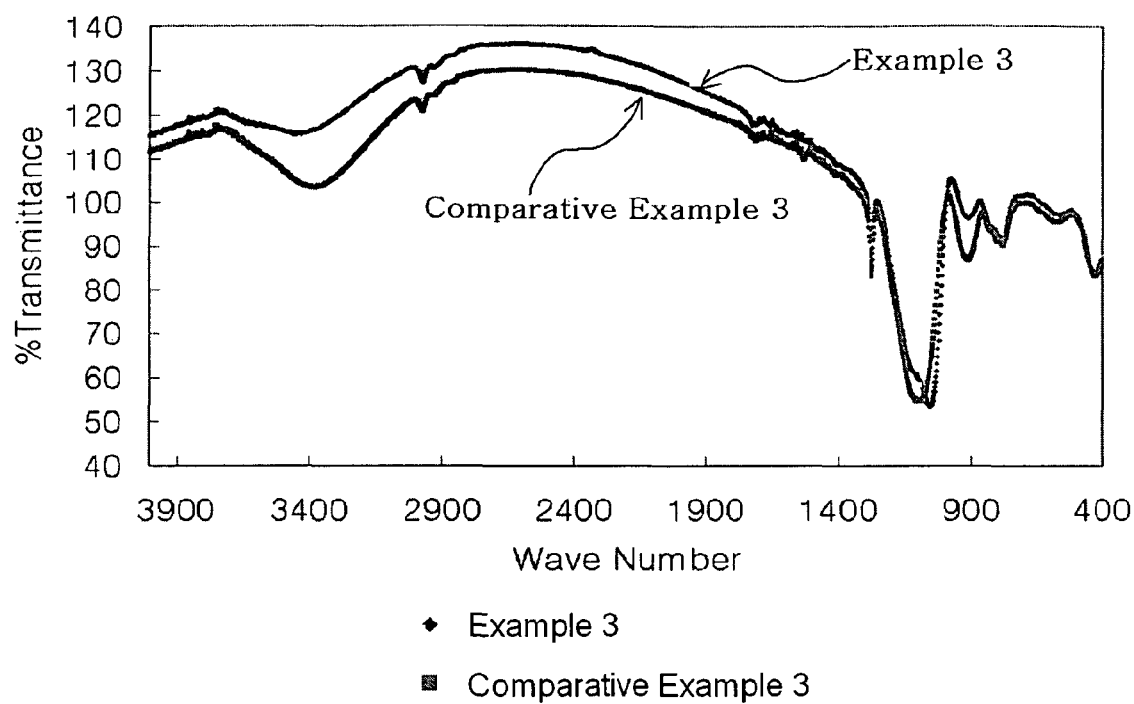
FIG. 3 is an IR (Infrared Spectroscopy) graph of the protecting film prepared in the present invention.

FIG. 3 is an IR (Infrared Spectroscopy) graph of the protecting film prepared from the composition containing the photobase generator and the protecting film prepared from the composition containing no photobase generator of Example 3 and Comparative Example 3. In the case of the protecting film prepared from the composition containing the photobase generator, Si—OH functional groups were significantly reduced, thereby obtaining the excellent barrier property to moisture.

The invention claimed is:

1. A composition for preparing a protecting film, comprising:
   a) organosiloxane polymer;
   b) photobase generator; and
   c) organic solvent,
   wherein the organosiloxane polymer a) is polymerized from a silane compound represented by the following Formula 1 or Formula 2:

$SiR^1_p R^2_{4-p}$     [Formula 1]

wherein,
   $R^1$ is each independently hydrogen; fluorine; aryl; vinyl; allyl; linear or branched alkyl having 1 to 20 carbon atoms that is unsubstituted or substituted with fluorine,
   $R^2$ is each independently a hydrolyzable functional group including linear or branched alkoxy having 1 to 4 carbon atoms, acetoxy, or chlorine,
   p is an integer of 0 to 2, and $R^3_q R^4_{3-q}\text{Si-M-SiR}^5_r R^6_{3-r}$     [Formula 2]

wherein,
   $R^3$ and $R^5$ are each independently hydrogen; fluorine; aryl; vinyl; allyl; or linear or branched alkyl having 1 to 20 carbon atoms that is unsubstituted or substituted with fluorine,
   $R^4$ and $R^6$ are each independently a hydrolyzable functional group including linear or branched alkoxy having 1 to 4 carbon atoms, acetoxy, or chlorine,
   M is alkylene having 1 to 6 carbon atoms or arylene,
   q and r are each independently an integer of 0 to 2.

2. The composition for preparing a protecting film according to claim 1, wherein the composition for preparing a protecting film is a composition for preparing a protecting film for a plastic substrate.

3. The composition for preparing a protecting film according to claim 1, wherein the organosiloxane polymer a) is polymerized from one or more silane compounds selected from the group consisting of one or more monomers selected from the group consisting of compounds represented by Formula 1 and Formula 2; a dimer prepared from the monomers; and an oligomer prepared from the monomers, dimers, or mixture thereof.

4. The composition for preparing a protecting film according to claim 1, wherein the organic solvent c) is one or more selected from the group consisting of aliphatic hydrocarbon-based solvent, aromatic hydrocarbon-based solvent, alcohol-based solvent, ketone-based solvent, ether-based solvent, ester-based solvent, and amide-based solvent.

5. The composition for preparing a protecting film according to claim 1, wherein the photobase generator b) is one or more selected from the group consisting of 2-nitrobenzylcarbamate, sulfone amide, o-acyloxime, and nifedipines.

6. The composition for preparing a protecting film according to claim 1, wherein the photobase generator b) is one or more selected from the group consisting of nitrobenzylcyclohexylcarbamate, 3,5-dimethoxybenzylcyclohexylcarbamate, 3-nitrophenylcyclohexylcarbamate, benzylcyclohexylcarbamate, [[(2-nitrobenzyl)oxy]carbonyl]octylamine, [[(2-nitrobenzyl)oxy]carbonyl]cyclohexylamine, [[(2-nitrobenzyl)oxy]carbonyl]piperazine, bis[[(2-nitrobenzyl)oxy]carbonyl]hexane-1,6-diamine, [[(2,6-dinitrobenzyl)oxy]carbonyl]cyclohexylamine, bis[[(2,6-dinitrobenzyl)oxy]carbonyl]hexane-1,6-diamine, N-[[(2-nitrophenyl)-1-methylmethoxy]carbonyl]cyclohexylamine, N-[[(2-nitrophenyl)-1-methylmethoxy]carbonyl]-octadecylamine, bis[[(a-methyl-2-nitrobenzyl)oxy]carbonyl]hexane, 1,6-diamine, N-[[(2,6-dinitrophenyl)-1-methylmethoxy]carbonyl]cyclohexylamine, N-[[(2-nitrophenyl)-1-(2'-nitrophenyl)methoxy]carbonyl]cyclohexylamine, N-[[(2,6-dinitrophenyl)-1-(2',6'-dinitrophenyl)methoxy]carbonyl]cyclohexylamine, N-cyclohexyl-4-methylphenylsulfonamide, N-cyclohexyl-2-naphthylsulfonamide, o-phenylacetyl-2-acetonaphthonoxim, and N-methylnifedipine.

7. The composition for preparing a protecting film according to claim 1, wherein the content of photobase generator b) is 0.1 to 15% by weight based on a total solid weight of organosiloxane.

8. The composition for preparing a protecting film according to claim 1, wherein the composition for preparing a protecting film comprises one or more compounds selected from the group consisting of silica particles, low-refractive index particles, high-refractive index particles, an antistatic agent, a silane coupling agent, a coloring agent, and a leveling agent.

9. A protecting film prepared from the composition for preparing a protecting film according to claim 1.

10. The protecting film according to claim 9, wherein a thickness of the protecting film is 0.05 to 2 μm.

11. A substrate comprising the protecting film of claim 9.

12. A component comprising the substrate of claim 11.

13. A device comprising the substrate of claim 11.

* * * * *